United States Patent
Song et al.

(10) Patent No.: US 10,674,407 B2
(45) Date of Patent: Jun. 2, 2020

(54) ADAPTIVE RESOURCE NEGOTIATION BETWEEN BASE STATIONS FOR ENHANCED INTERFERENCE COORDINATION

(71) Applicant: QUALCOMM Incorporated, San Diego, CA (US)

(72) Inventors: Osok Song, San Diego, CA (US); Aleksandar Damnjanovic, Del Mar, CA (US); Tingfang Ji, San Diego, CA (US); Parag Arun Agashe, San Diego, CA (US); Jaber Mohammad Borran, San Diego, CA (US); Madhavan Srinivasan Vajapeyam, San Diego, CA (US); Stefan Geirhofer, Brooklyn, NY (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/969,516

(22) Filed: May 2, 2018

(65) Prior Publication Data
US 2018/0255482 A1    Sep. 6, 2018

Related U.S. Application Data

(63) Continuation of application No. 13/084,763, filed on Apr. 12, 2011, now abandoned.
(Continued)

(51) Int. Cl.
*H04W 28/16* (2009.01)
*H04W 92/20* (2009.01)

(52) U.S. Cl.
CPC ............ *H04W 28/16* (2013.01); *H04W 92/20* (2013.01)

(58) Field of Classification Search
None
See application file for complete search history.

(56) References Cited

U.S. PATENT DOCUMENTS

2005/0182788 A1* 8/2005 Arndt ................. G06F 9/45533
2009/0161617 A1  6/2009 Abedi
(Continued)

FOREIGN PATENT DOCUMENTS

EP    2067314 A1    6/2009
JP    2009153133 A  7/2009

OTHER PUBLICATIONS

3GPP, Technical Specification Group Radio Access Network; Evolved Universal Terrestrial Radio Access (E-UTRA) and Evolved Universal Terrestrial Radio Access Network (E-UTRAN); Overall description;(Release 8), 3GPP Standard; 3GPP TS 36.423, 3rd Generation Partnership Project (3GPP), Dec. 2009.
(Continued)

*Primary Examiner* — Gregory B Sefcheck
*Assistant Examiner* — Jenkey Van
(74) *Attorney, Agent, or Firm* — Patterson + Sheridan, L.L.P.

(57) ABSTRACT

Methods and apparatus for supporting adaptive resource negotiation between evolved node Bs (eNBs) for enhanced inter-cell interference coordination (eICIC) are provided. This resource negotiation may occur via a network backhaul between the eNBs or, in some cases, using over-the-air messages (OAMs). For certain aspects, a first eNB may propose its adaptive resource partitioning information (ARPI) to a second eNB, where the second eNB may accept or reject the proposed resource partitioning. If the second eNB accepts the proposed partitioning, the second eNB may schedule resources, such as subframes, based on the accepted partitioning.

20 Claims, 11 Drawing Sheets

Related U.S. Application Data

(60) Provisional application No. 61/323,811, filed on Apr. 13, 2010.

(56) References Cited

U.S. PATENT DOCUMENTS

| | | | |
|---|---|---|---|
| 2009/0168716 A1* | 7/2009 | Moon | H04W 72/04 370/329 |
| 2009/0201867 A1* | 8/2009 | Teo | H04L 5/0037 370/329 |
| 2010/0029282 A1 | 2/2010 | Stamoulis et al. | |
| 2010/0080166 A1 | 4/2010 | Palanki et al. | |
| 2010/0195582 A1 | 8/2010 | Koskinen | |
| 2010/0267408 A1* | 10/2010 | Lee | H04W 52/243 455/509 |
| 2011/0201339 A1 | 8/2011 | Kuningas | |
| 2011/0228700 A1* | 9/2011 | Mildh | H04B 7/2606 370/254 |
| 2011/0249642 A1 | 10/2011 | Song et al. | |
| 2012/0015659 A1* | 1/2012 | Kalyani | H04W 72/085 455/436 |
| 2012/0071182 A1* | 3/2012 | Cho | H04W 16/02 455/501 |
| 2012/0134275 A1* | 5/2012 | Choi | H04L 5/0057 370/241 |
| 2012/0156984 A1* | 6/2012 | Gan | H04B 7/15542 455/7 |
| 2013/0003646 A1* | 1/2013 | Michel | H04B 7/15592 370/315 |

OTHER PUBLICATIONS

3GPP TSG-RAN WG1 #58bis R1-094199, Specification impact of almost blank subframes, Qualcomm Europe, Oct. 12, 2009.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), 3GPP Standard; 3GPP TS 36.300, 3rd Generation Partnership Project (3GPP), Mobile Competence Centre ; 650, Route Des Lucioles ; F-06921 Sophia-Antipolis Cedex ; France, No. V10.2.0, Dec. 18, 2010 (Dec. 18, 2010), pp. 1-200, XP050462130, (retrieved on Dec. 18, 2010).

3rd Generation Partnership Project; Technical Specification Group Radio Access Network; Evolved Universal Terrestrial Radio Access Network (E-UTRAN); X2 application protocol (X2AP) (Release 9), 3GPP Standard; 3GPP TS 36.423, 3RD 77,90, Generation Partnership Project (3GPP), 91,104, Mobile Competence Centre ; 650, Route Des 105 Lucioles ; F-06921 Sophia-Antipolis Cedex ; France, No. V9.2.0, Mar. 31, 2010 (Mar. 31, 2010), pp. 1-120, XP050402275, [retrieved on Mar. 31, 2010].

CATT: "Considerations on Interference Coordination in Het-Net", 3GPP Draft; R1-100902, 3rd Generation Partnership Project (3GPP), Mobile Competence Centre ; 650, Route Des Lucioles ; F-06921 Sophia-Antipolis Cedex ; France, vol. RAN WGI, No. San Francisco, USA; Feb. 22, 2010, Feb. 16, 2010 (Feb. 16, 2010), XP050418504, [retrieved on Feb. 16, 2010].

"How to Calculate the Number of used PRBs in LTE Network?," https://www.researchgate.net/post/How_to_calculate_the_numbers_of_used_PRBs_in_LTE_network2.

International Preliminary Report on Patentability—PCT/US2011/032360, The International Bureau of WIPO—Geneva, Switzerland—dated Oct. 16, 2012.

International Search Report and Written Opinion—PCT/US2011/032360, ISA/EPO—dated Jul. 18, 2011.

"LTE; Evolved Universal Terrestrial Radio Access Network (EUTRAN); X2 Application Protocol (X2AP)". 3GPP TS 36.423 version 9.1.0 Release 9. Feb. 2010.

NTT DOCOMO: "Downlink Interference Coordination Between eNodeB and Home eNodeB", 36PP Draft; R1-101225 HENB_ICIC, 3rd Generation Partnership Project (3GPP), Mobile Competence Centre 650, Route Des Lucioles ; F-06921 Sophia-Antipolis Cedex ; France, vol. RAN WGI, No. San Francisco, USA; Feb. 22, 2010, Feb. 16, 2010 (Feb. 16, 2010), XP050418740, [retrieved on Feb. 16, 2010]., p. 1-8.

NTT DOCOMO: "Interference Coordination for Non-CA-based Heterogeneous Networks", 3GPP Draft; R1-102307 ICIC for Non-CA Hetnet, 3rd Generation Partnership Project (3GPP), Mobile Competence Centre; 650, Route Des Lucioles; F-06921 Sophia-Antipolis Cedex; France, vol. RAN WG1, No. Beijing, china; Apr. 12, 2010, Apr. 7, 2010 (Apr. 7, 2010), pp. 1-11, XP050419698, [retrieved on Apr. 7, 2010].

Qualcomm Incorporated: "Extending Rel-8/9 ICIC into Rel-10", 3GPP Draft; R1-101505 Extending REL-8-9 ICIC Into REL-10, 3rd Generation Partnership Project (3GPP), Mobile Competence Centre ; 650, Route Des Lucioles ; F-06921 Sophia-Antipolis Cedex; France, vol. RAN WG1, No. San Francisco, USA; Feb. 22, 2010, Feb. 16, 2010 (Feb. 16, 2010), pp. 1-4, XP050418951, [retrieved on Feb. 16, 2010].

* cited by examiner

Table 1 SRPI of Macro eNB

| Index | 0 | 1 | 2 | 3 | 4 | 5 | 6 | 7 |
|---|---|---|---|---|---|---|---|---|
| SRPI value | X | X | X | U | X | X | X | N |

Table 2 SRPI of Femto eNB

| Index | 0 | 1 | 2 | 3 | 4 | 5 | 6 | 7 |
|---|---|---|---|---|---|---|---|---|
| SRPI value | X | X | X | N | X | X | X | U |

FIG. 5

ADAPTIVE RESOURCE NEGOTIATION BETWEEN BASE STATIONS FOR ENHANCED INTERFERENCE COORDINATION

CROSS-REFERENCE TO RELATED APPLICATIONS

This application is a Continuation Application of U.S. patent application Ser. No. 13/084,763, filed Apr. 12, 2011, which claims benefit of U.S. Provisional Patent Application Ser. No. 61/323,811, entitled "Adaptive Resource Negotiation between Base Stations for Enhanced Interference Coordination" and filed Apr. 13, 2010, each of which is herein incorporated by reference.

BACKGROUND

I. Field

Certain aspects of the present disclosure generally relate to wireless communications, and more specifically to adaptive resource negotiation between base stations for enhanced inter-cell interference coordination (eICIC).

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

Certain aspects of the present disclosure provide a method for wireless communications. The method generally includes sending, from a first base station, a resource status message to a second base station; receiving, at the first base station from the second base station, a message indicating proposed resource partitioning between the first and second base stations, wherein the proposed resource partitioning is based on the resource status message; and scheduling resources at the first base station based on the received resource partitioning.

Certain aspects of the present disclosure provide an apparatus for wireless communications. The apparatus generally includes means for sending a resource status message to a base station; means for receiving, from the base station, a message indicating proposed resource partitioning between the apparatus and the base station, wherein the proposed resource partitioning is based on the resource status message; and means for scheduling resources based on the received resource partitioning.

Certain aspects of the present disclosure provide an apparatus for wireless communications. The apparatus generally includes processor transmitter, a receiver, and a scheduler. The transmitter is typically configured to send a resource status message to a base station, and the receiver is configured to receive, from the base station, a message indicating proposed resource partitioning between the apparatus and the base station, wherein the proposed resource partitioning is based on the resource status message. The scheduler is generally configured to schedule resources based on the received resource partitioning.

Certain aspects of the present disclosure provide a computer-program product for wireless communications. The computer-program product typically includes a computer-readable medium having code for sending, from a first base station, a resource status message to a second base station; for receiving, at the first base station from the second base station, a message indicating proposed resource partitioning between the first and second base stations, wherein the proposed resource partitioning is based on the resource status message; and for scheduling resources at the first base station based on the received resource partitioning.

Certain aspects of the present disclosure provide a method for wireless communications. The method generally includes receiving, at a first base station, a resource status message from a second base station; determining one or more parameters related to resource usage at the first base station; determining proposed resource partitioning between the first and second base stations based on the received resource status message and the parameters; and sending, from the first base station to the second base station, an indication of the proposed resource partitioning.

Certain aspects of the present disclosure provide an apparatus for wireless communications. The apparatus generally includes means for receiving a resource status message from a base station, means for determining one or more parameters related to resource usage at the apparatus, means for determining proposed resource partitioning between the apparatus and the base station based on the received resource status message and the parameters, and means for sending, to the base station, an indication of the proposed resource partitioning.

Certain aspects of the present disclosure provide an apparatus for wireless communications. The apparatus generally includes a receiver, at least one processor, and a transmitter. The receiver is typically configured to receive a resource status message from a base station. The at least one processor is generally configured to determine one or more parameters related to resource usage at the apparatus and to determine proposed resource partitioning between the apparatus and the base station based on the received resource status message and the parameters. The transmitter is typically configured to send an indication of the proposed resource partitioning to the second base station.

Certain aspects of the present disclosure provide a computer-program product for wireless communications. The computer-program product typically includes a computer-readable medium having code for receiving, at a first base station, a resource status message from a second base station; for determining one or more parameters related to resource usage at the first base station; for determining proposed resource partitioning between the first and second base stations based on the received resource status message and the parameters; and for sending, from the first base station to the second base station, an indication of the proposed resource partitioning.

Various aspects and features of the disclosure are described in further detail below.

BRIEF DESCRIPTION OF THE DRAWINGS

FIG. 5 illustrates example resource partitioning in a heterogeneous network in accordance with certain aspects of the present disclosure.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Example Wireless Network

Figure 1:
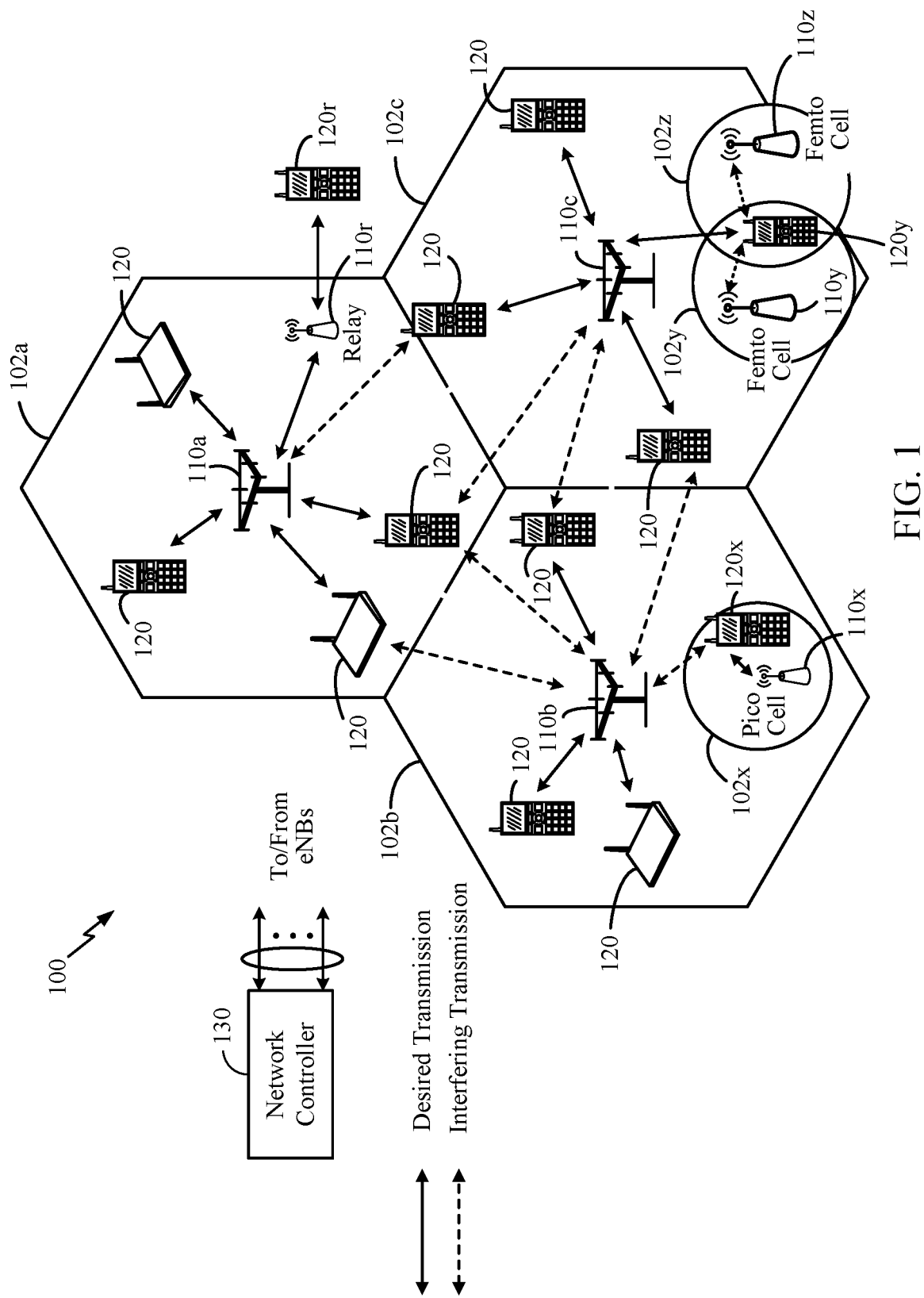
FIG. 1 is a block diagram conceptually illustrating an example of a wireless a communications network in accordance with certain aspects of the present disclosure.

FIG. 1 shows a wireless communication network 100, which may be an LTE network. The wireless network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, eNBs 110a, 110b, and 110c may be macro eNBs for macro cells 102a, 102b, and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

The wireless network 100 may be a heterogeneous network (HetNet) that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

Figure 2:
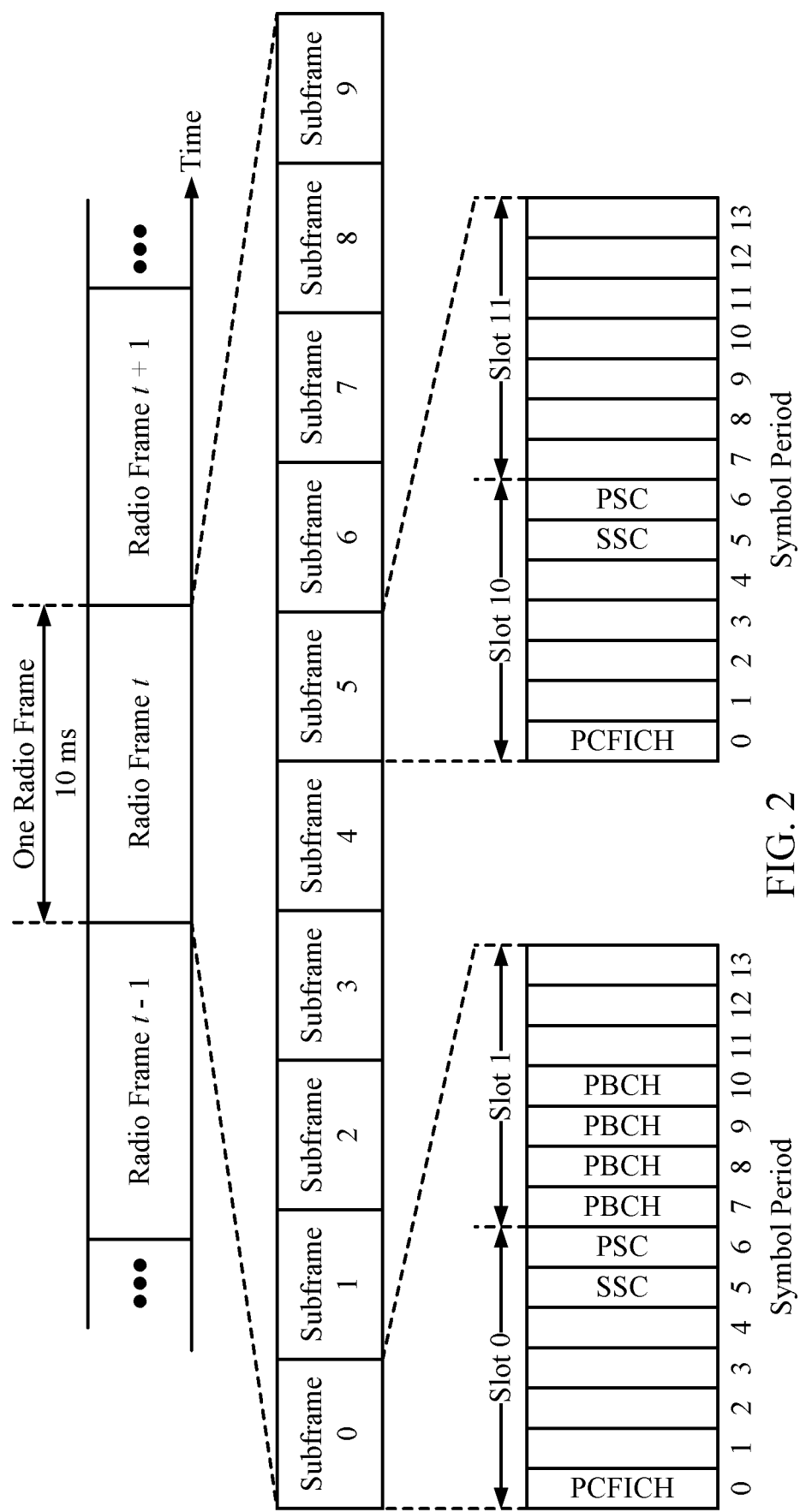
FIG. 2 is a block diagram conceptually illustrating an example of a frame structure in a wireless communications network in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
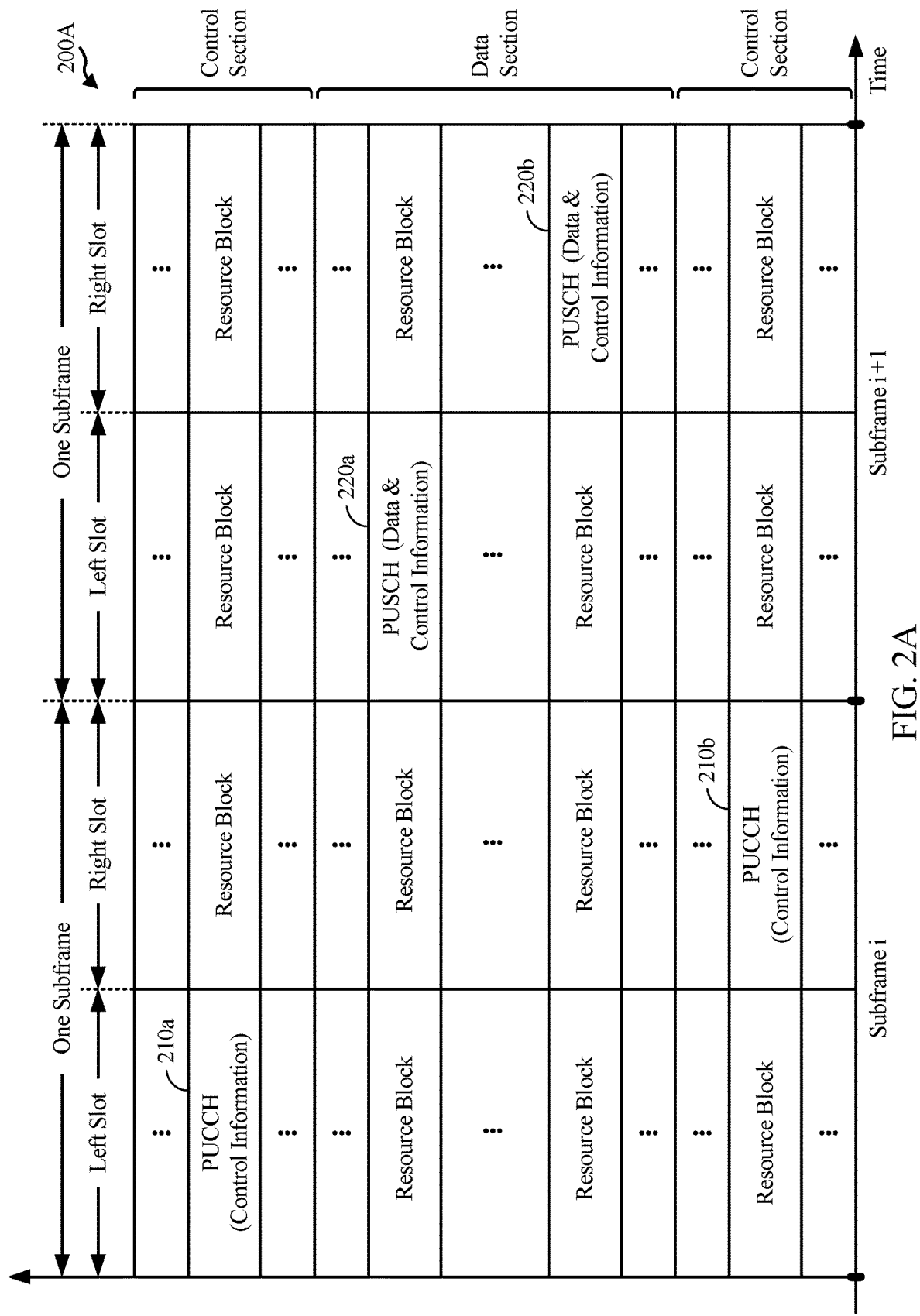
FIG. 2A is a block diagram conceptually illustrating an example of an uplink allocation of resources in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNB. The UE may transmit control information in a Physical Uplink Control Channel (PUCCH) 210 on the assigned resource blocks in the control section. The UE may transmit only data or both data and control information in a Physical Uplink Shared Channel (PUSCH) 220 on the assigned resource blocks in the data section. An uplink transmission may span both slots of a subframe and may hop across frequency as shown in FIG. 2A.

A UE may be within the coverage of multiple eNBs. One of these eNBs may be selected to serve the UE. The serving eNB may be selected based on various criteria such as received power, pathloss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower pathloss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the pathloss for eNB 110x is lower than the pathloss for macro eNB 110b. This may result in less interference to the wireless network for a given data rate for UE 120x.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the received power of signals from the eNB received at a UE (and not based on the transmit power level of the eNB).

Figure 3:
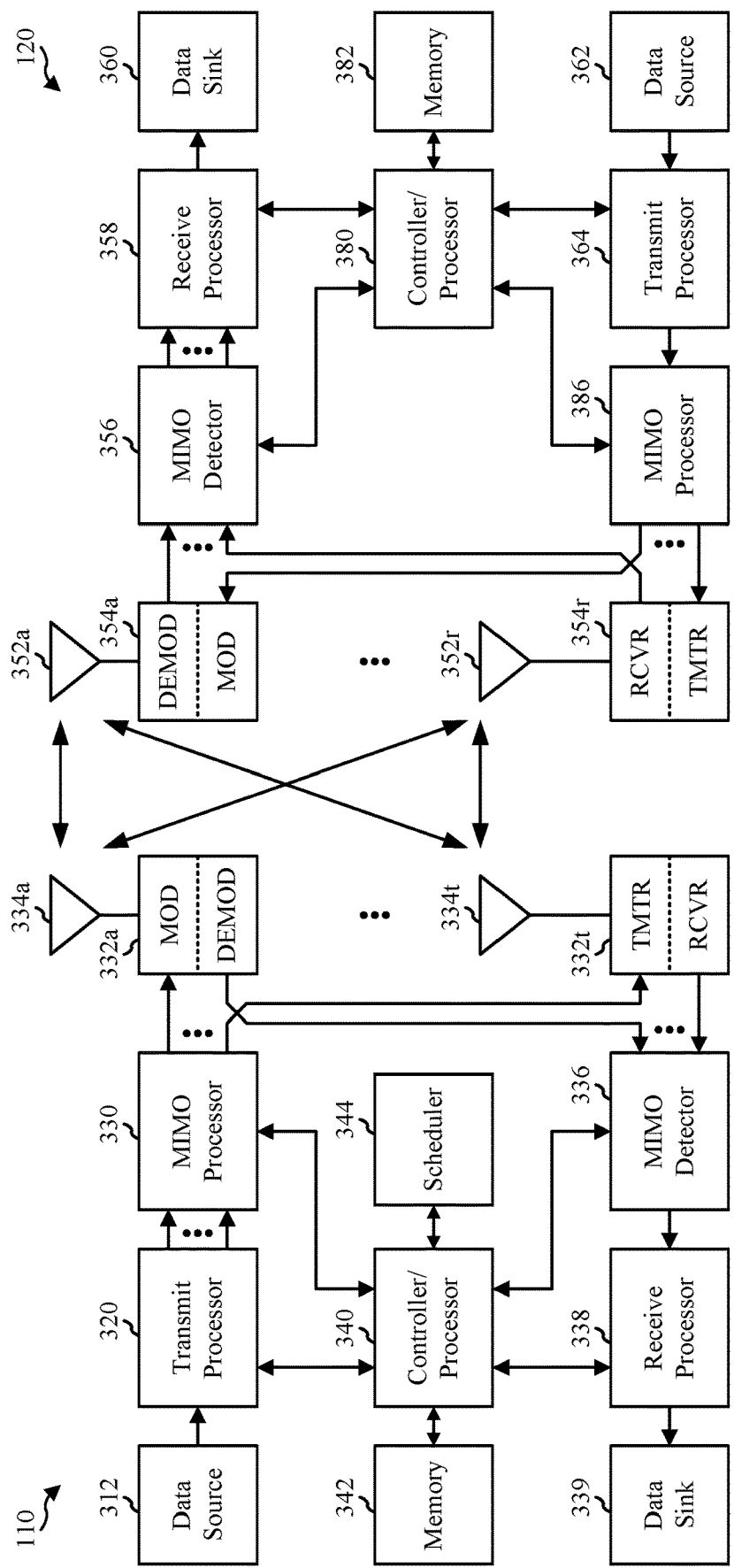
FIG. 3 is a block diagram conceptually illustrating an example of a Node B in communication with a user equipment (UE) in a wireless communications network in accordance with certain aspects of the present disclosure.

FIG. 3 is a block diagram of a design of a base station or an eNB 110 and a UE 120, which may be one of the base stations/eNBs and one of the UEs in FIG. 1. For a restricted association scenario, the eNB 110 may be macro eNB 110c in FIG. 1, and the UE 120 may be UE 120y. The eNB 110 may also be a base station of some other type. The eNB 110 may be equipped with T antennas 334a through 334t, and the UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from the UE 120 may be received by the antennas 334, processed by demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the eNB 110 and the UE 120, respectively. The controller/processor 340 and/or other processors and modules at the eNB 110 may perform or direct operations for blocks 900 in FIG. 9, operations for blocks 1000 in FIG. 10, and/or other processes for the techniques described herein.

The memories 342, 382 may store data and program codes for the eNB 110 and the UE 120, respectively. A scheduler 344 may schedule UEs for data transmission on the downlink and/or uplink.

Example Resource Partitioning

According to certain aspects of the present disclosure, when a network supports enhanced inter-cell interference coordination (eICIC), the base stations may negotiate with each other to coordinate resources in order to reduce/eliminate interference by the interfering cell giving up part of its resources. In accordance with this interference coordination, a UE may be able to access a serving cell even with severe interference by using the resources yielded by the interfering cell.

For example, a femto cell with a closed access mode (i.e., only a member femto UE can access the cell) in the coverage area of an open macro may be able to create a "coverage hole" for the macro cell. By negotiating for the femto cell to yield some of its resources, effectively removing interference, the macro UE under the femto cell coverage area may still be able to access the UE's serving macro cell using these yielded resources.

In a radio access system using OFDM, such as Evolved Universal Terrestrial Radio Access Network (E-UTRAN), the yielded resources may be time based, frequency based, or a combination of both. When the coordinated resource partitioning is time based, the interfering cell may simply not use some of the subframes in the time domain. When the yielded resources (i.e., the coordinated resource partitioning) are frequency based, the interfering cell may yield subcarriers in the frequency domain. When the coordinated resource partitioning is a combination of both frequency and time, the interfering cell may yield certain frequency and time resources.

Figure 4:
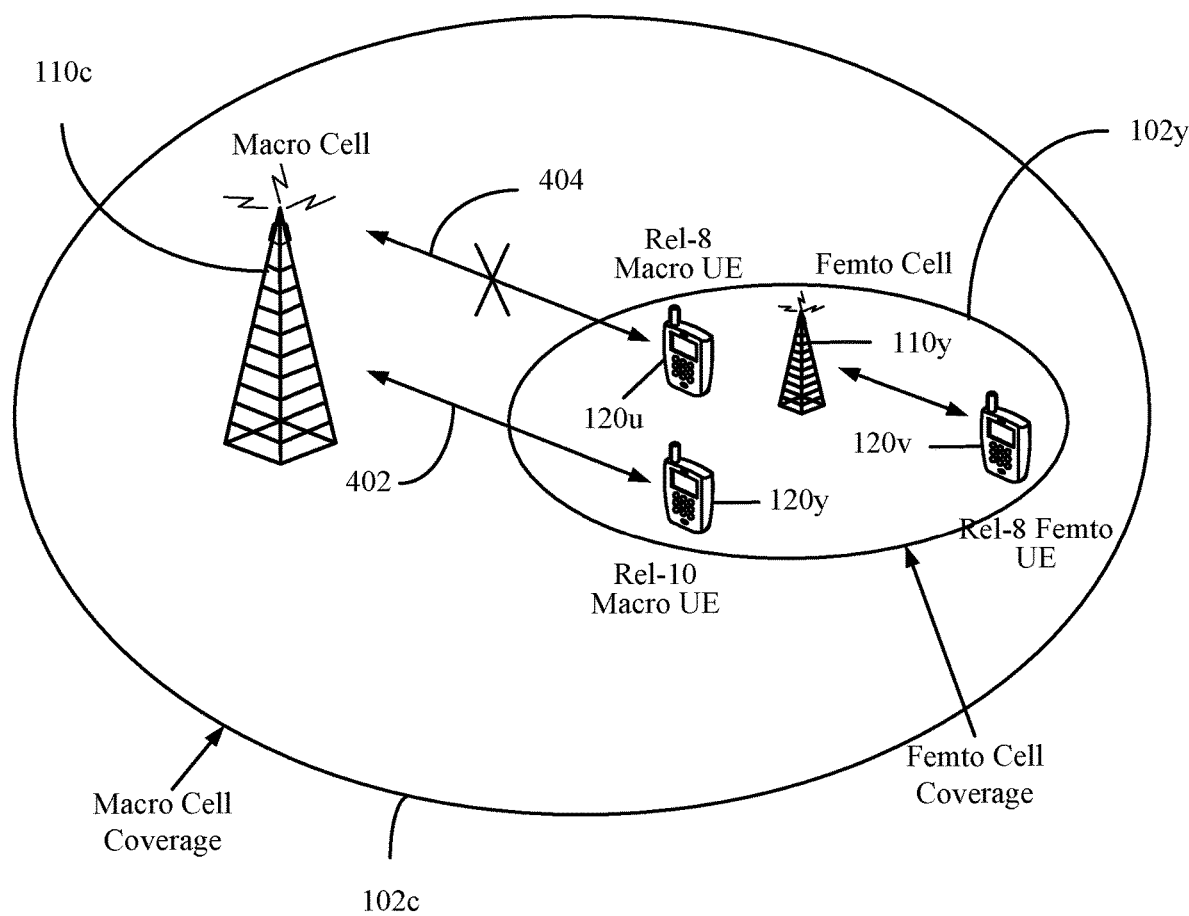
FIG. 4 illustrates an example heterogeneous network in accordance with certain aspects of the present disclosure.

FIG. 4 illustrates an example scenario where eICIC may allow a macro UE 120y supporting eICIC (e.g., a Rel-10 macro UE as shown in FIG. 4) to access the macro cell 110c even when the macro UE 120y is experiencing severe interference from the femto cell 110y, as illustrated by the solid radio link 402. A legacy macro UE 120u (e.g., a Rel-8 macro UE as shown in FIG. 4) may not be able to access the macro cell 110c under severe interference from the femto cell 110y, as illustrated by the broken radio link 404. A femto UE 120v (e.g., a Rel-8 femto UE as shown in FIG. 4) may access the femto cell 110y without any interference problems from the macro cell 110c.

According to certain aspects, networks may support eICIC, where there may be different sets of partitioning information. A first of these sets may be referred to as Semi-Static Resource Partitioning Information (SRPI). A second of these sets may be referred to as Adaptive Resource Partitioning Information (ARPI). As the name implies, SRPI typically does not change frequently, and SRPI may be sent to a UE so that the UE can use the resource partitioning information for the UE's own operations.

As an example, the resource partitioning may be implemented with 8 ms periodicity (8 subframes) or 40 ms periodicity (40 subframes). According to certain aspects, it may be assumed that frequency division duplexing (FDD) may also be applied such that frequency resources may also be partitioned. For communications via the downlink (e.g., from a cell node B to a UE), a partitioning pattern may be mapped to a known subframe (e.g., a first subframe of each radio frame that has a system frame number (SFN) value that is a multiple of an integer N, such as 4). Such a mapping may be applied in order to determine resource partitioning information (RPI) for a specific subframe. As an example, a subframe that is subject to coordinated resource partitioning (e.g., yielded by an interfering cell) for the downlink may be identified by an index:

$$Index_{SRPI\_DL} = (SFN*10 + subframe\ number)\ mod\ 8$$

For the uplink, the SRPI mapping may be shifted, for example, by 4 ms. Thus, an example for the uplink may be:

$$Index_{SRPI\_UL} = (SFN*10 + subframe\ number + 4)\ mod\ 8$$

SRPI may use the following three values for each entry:
U (Use): this value indicates the subframe has been cleaned up from the dominant interference to be used by this cell (i.e., the main interfering cells do not use this subframe);
N (No Use): this value indicates the subframe shall not be used; and
X (Unknown): this value indicates the subframe is not statically partitioned.
Details of resource usage negotiation between base stations are not known to the UE.
Another possible set of parameters for SRPI may be the following:
U (Use): this value indicates the subframe has been cleaned up from the dominant interference to be used by this cell (i.e. the main interfering cells do not use this subframe);
N (No Use): this value indicates the subframe shall not be used;
X (Unknown): this value indicates the subframe is not statically partitioned (and details of resource usage negotiation between base stations are not known to the UE); and
C (Common): this value may indicate all cells may use this subframe without resource partitioning. This subframe may be subject to interference, so that the base station may choose to use this subframe only for a UE that is not experiencing severe interference.

The serving cell's SRPI may be broadcasted over the air. In E-UTRAN, the SRPI of the serving cell may be sent in a master information block (MIB), or one of the system information blocks (SIBs). A predefined SRPI may be defined based on the characteristics of cells, e.g. macro cell, pico cell (with open access), and femto cell (with closed access). In such a case, encoding of SRPI in the system overhead message may result in more efficient broadcasting over the air.

The base station may also broadcast the neighbor cell's SRPI in one of the SIBs. For this, SRPI may be sent with its corresponding range of physical cell identities (PCIs).

ARPI may represent further resource partitioning information with the detailed information for the 'X' subframes in SRPI. As noted above, detailed information for the 'X' subframes is typically known only to the base stations, and a UE does not know it.

Figure 6:
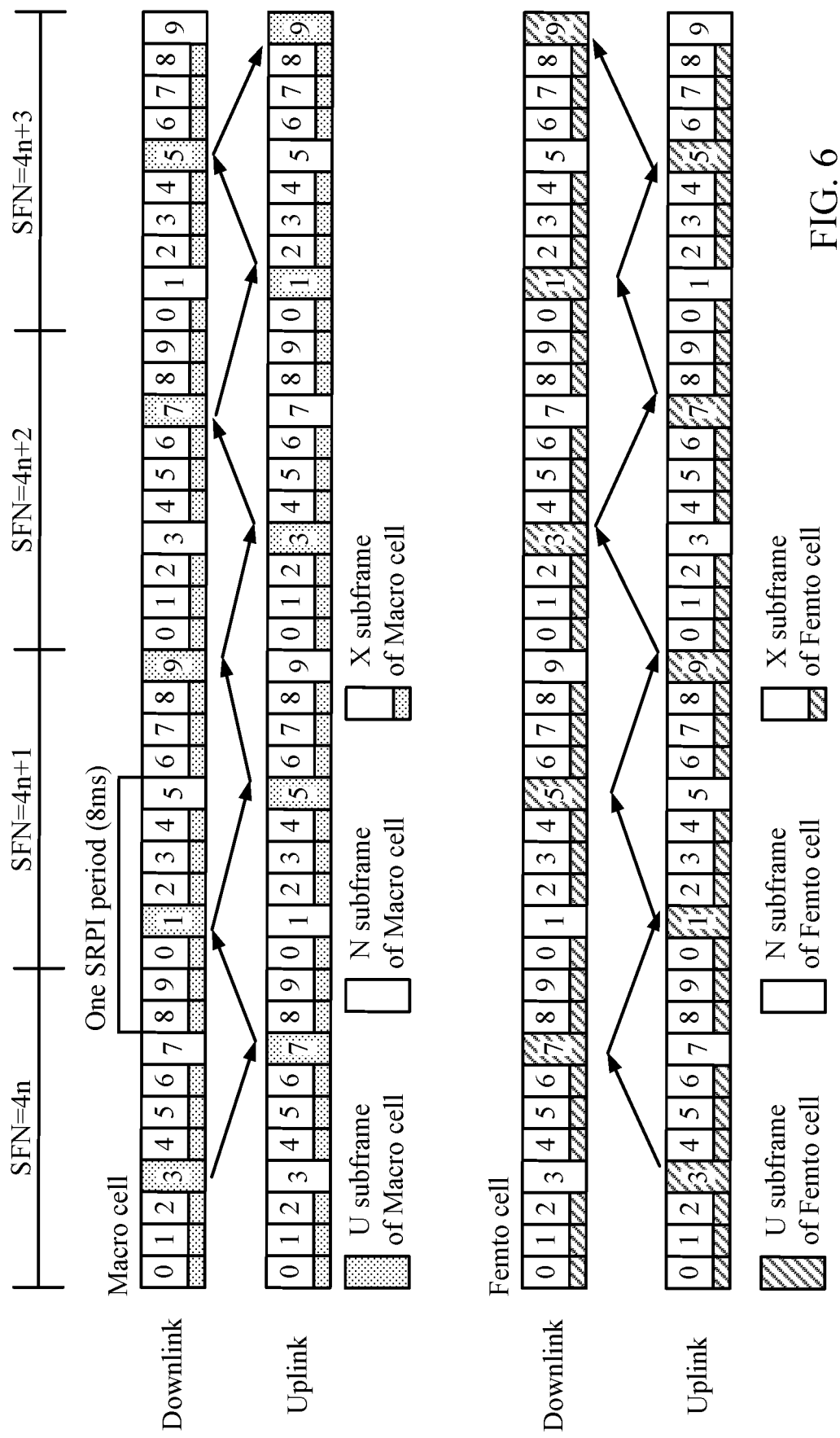
FIG. 6 illustrates example cooperative partitioning of subframes in a heterogeneous network in accordance with certain aspects of the present disclosure.

FIGS. 5 and 6 illustrate examples of SRPI assignment in the scenario with macro and femto cells.

Example Adaptive Resource Negotiation

As described above, a key mechanism for heterogeneous networks (HetNets) may be partitioning of resources. As an example, a cell may be silent on a particular subframe, allowing users from a neighbor cell that are under its coverage to be served. From the point of view of users experiencing significant interference, time-division multiplexing (TDM) partitioning between cells may broadly create two classes of subframes: clean (protected) and unclean (unprotected) subframes.

In homogeneous networks, eNBs in close proximity to each other may likely be from the same vendor. Thus, proprietary signaling and collaboration among neighbors may be possible and, perhaps, preferred.

In HetNet deployment, it may be quite likely that eNBs of different power classes are from different vendors and rely on a standardized interference. Signaling may rely on minimum performance testing or interoperability testing (TOT) to ensure robust performance. Certain network implementations may take bolder steps to ensure cross-vendor interference cancellation and resource coordination. According to certain aspects of the present disclosure, adaptive resource partitioning may not be limited to current measurement and signaling techniques.

Load balancing in homogeneous networks may imply changing the bias of each cell to match the load. As a result, more even distribution of offered load may be achieved. However, a lower UE SNR may be used since the strongest cell may not be used.

In HetNets, a similar concept may be used with enhancement. As a result, a more even distribution of offered load may be achievable, and a UE's SNR may be controlled via resource partitioning. According to certain aspects, HetNet designs may include tight coupling of load balancing (handover) and resource partitioning. Decoupling load balancing and resource partitioning may be challenging, but desirable.

Figure 7:
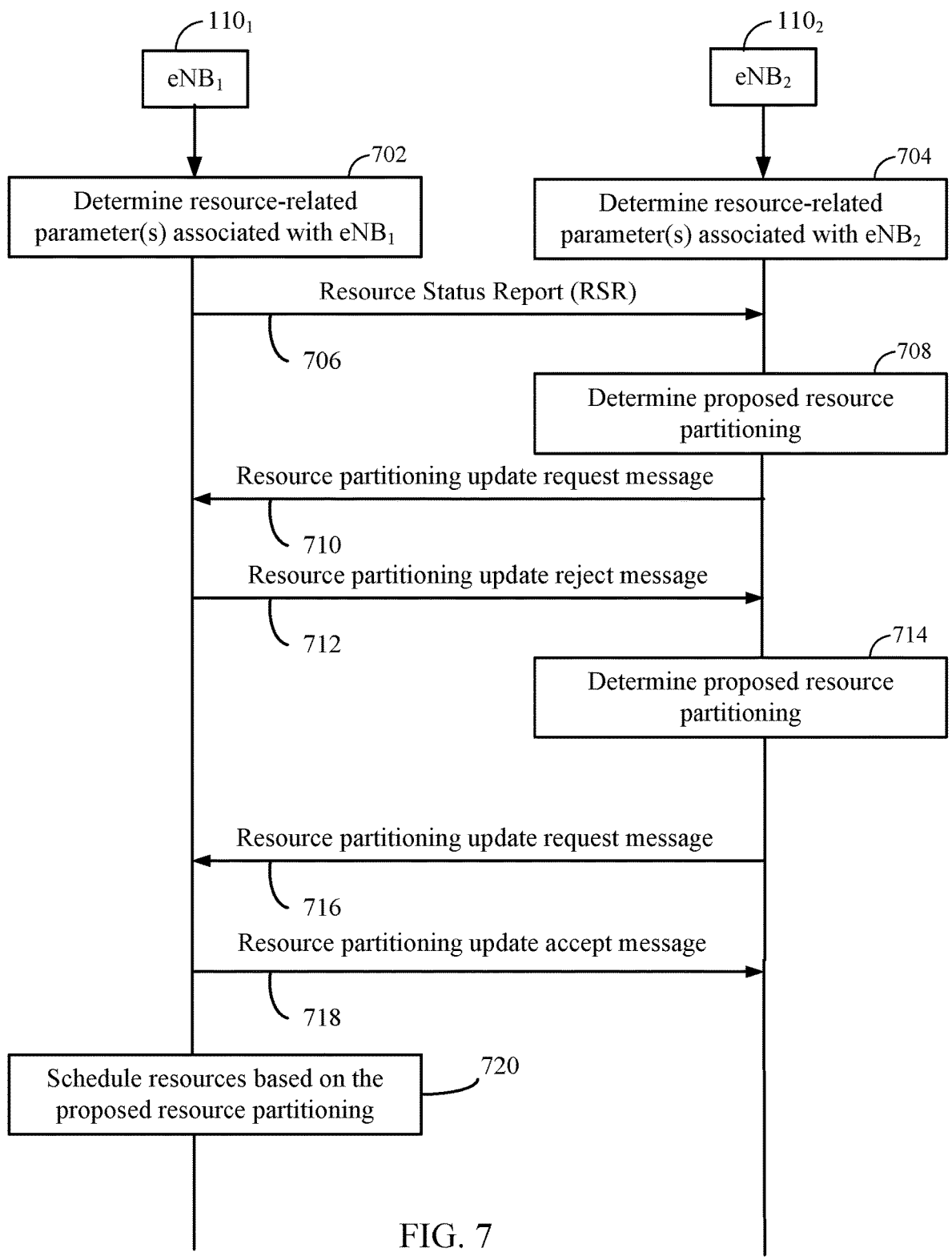
FIG. 7 illustrates an example call-flow diagram for scheduling resources at a first base station based on proposed resource partitioning from a second base station, in accordance with certain aspects of the present disclosure.

FIG. 7 illustrates a peer-to-peer negotiation algorithm between $eNB_1$ 110$_1$ and $eNB_2$ 110$_2$, according to certain aspects of the present disclosure. Initially, at 702, $eNB_1$ 110$_1$ may determine one or more resource-related parameters associated with $eNB_1$ and, at 704, $eNB_2$ 110$_2$ may determine one or more resource-related parameters associated with $eNB_2$. Based on the determined one or more resource-related parameters, $eNB_1$ 110$_1$ may send a resource status report (RSR) to $eNB_2$ at 706. For certain aspects, communication between $eNB_1$ and $eNB_2$, such as the RSR, may be sent via an X2 backhaul coupling the two eNBs. After receiving the RSR from $eNB_1$, $eNB_2$ may determine a proposed resource partitioning at 708 and may transmit a resource partitioning update request message at 710 to $eNB_1$, indicating this proposed partitioning. $eNB_1$ may reject the proposed partitioning indicated by the received resource partitioning update message for various reasons and, in response, may transmit a resource partitioning update reject message at 712 to $eNB_2$, in an effort to indicate this rejection to $eNB_2$.

Upon receiving the resource partitioning update reject message from $eNB_1$, $eNB_2$ may determine another proposed resource partitioning at 714 and may transmit another resource partitioning update request message at 716 to $eNB_1$. $eNB_1$ may accept the proposed resource partitioning indicated by the received request message and may send a resource partitioning update accept message at 718 to $eNB_2$, indicating this acceptance to $eNB_2$. Based on the proposed resource partitioning received from $eNB_2$, $eNB_1$ may schedule resources accordingly at 720.

This process of determining a proposed resource partitioning and sending an indication of the proposed resource partitioning in an update request message may be repeated until $eNB_1$ accepts the proposed resource partitioning and $eNB_2$ receives an update accept message indicating this acceptance by $eNB_1$. For certain aspects, the originally proposed resource partitioning determined at 708 may be accepted by $eNB_1$ after receipt of the update request message at 710. In this case, the flow in FIG. 7 may jump down to $eNB_1$ sending a resource partitioning update accept message at 718 to $eNB_2$, indicating this acceptance to $eNB_2$. Based on the originally proposed resource partitioning received from $eNB_2$, $eNB_1$ may schedule resources accordingly at 720.

For certain aspects, received resource partitioning update request messages at 710 or 716 may indicate one or more almost blank subframes (ABSs, also termed ABSFs) of $eNB_2$ 110$_2$. For certain aspects, the message indicating the proposed resource partitioning may comprise a load information message indicating the ABSs. For certain aspects, the load information message may comprise one or more information elements (IEs) indicating the ABSs.

According to certain aspects, each pair of nodes may negotiate a partitioning rule between them. This does not preclude master-slave type of negotiation (e.g., a macro base station may have the final say when negotiating with a femto base station). As a result, each cell may have a set of ARPIs.

According to certain aspects of the present disclosure, X2-based communication may be used as negotiation links between two cells. A link may be established based on UE radio resource management (RRM) reports, for example using automatic neighbor relation (ANR) method (e.g., RSRP(neighbor cell)−RSRP(serving cell)≥threshold, where RSRP is a reference signal receive power). A set of negotiation links may constitute a "jamming graph."

According to certain aspects of the present disclosure, an extended boundary area (EBA) may be defined as an area between two negotiating cells under which a UE would prefer protected resources to be scheduled.

According to certain aspects, adaptive partitioning may be adaptable to bursty traffic. This may be different depending on the appropriate priority of guaranteed bit rate (GBR) versus non-GBR traffic. As an example, GBR may have absolute priority in the negotiation. According to certain aspects, a physical resource block (PRB) usage metric may be used to capture the burstiness of traffic and load of a cell. If full load is reached by both cells, fairness criteria may be used as a tie-breaker to update the algorithm.

When the network supports eICIC, two different sets of partitioning information, namely SRPI and ARPI, may exist. SRPI does not change frequently and may use the following three values for each entry as described above: U, N, or X.

ARPI represents further resource partitioning information with the detailed information for the 'X' subframes in SRPI. The detailed information for the 'X' subframes is only known to the eNBs, and a UE does not know it. According to certain aspects, eNBs may use X2 messages or over-the-air messages (OAMs) to negotiate ARPI configuration. ARPI may use the following values for each entry:

AU (Adaptive Use): same as U from eNB scheduling point of view, but not known to the UE;

AN (Adaptive No Use): same as N from eNB scheduling point of view, but not known to the UE; and AC (Adaptive Common): all cells may use this subframe without TDM partitioning, but not known to the UE.

The initial X subframes of SRPI may be set to 'AC' in ARPI.

There may be four X2 procedures to support adaptive resource negotiation in HetNet. These may include:

1. Initial association between eNBs for eICIC, where, for certain aspects, using an X2 setup procedure for the association may comprise receiving, at a first base station, at least one of a class or an access mode of a second base station;
2. Background resource status procedure, where there may be a periodic exchange of resource status between eNBs and reuse of the existing messages with additional information elements (IEs);
3. Adaptive resource negotiation procedure which may include a resource partitioning update request message (which may contain suggested ARPI between two cells), a resource partitioning update accept message, and a resource partitioning update reject message; and
4. Range expansion request procedure (for pico scenario). This procedure starts to use range expansion and may involve adjusting cell specific offset for handover (HO). This procedure may be combined either with the adaptive resource negotiation procedure or a mobility setting change procedure (range expansion request procedure was defined in Rel-9 in the context of self organizing networks (SONs)).

To initially associate the eNBs, an X2 setup procedure and an eNB configuration update procedure may be used. This can be triggered by a UE's measurement report and as part of an ANR procedure. During this initial association, eNB class and access mode may be exchanged, including whether the eNB is a macro eNB, a femto eNB (closed access home eNB (HeNB)), or a pico eNB (open access HeNB).

Figure 8:
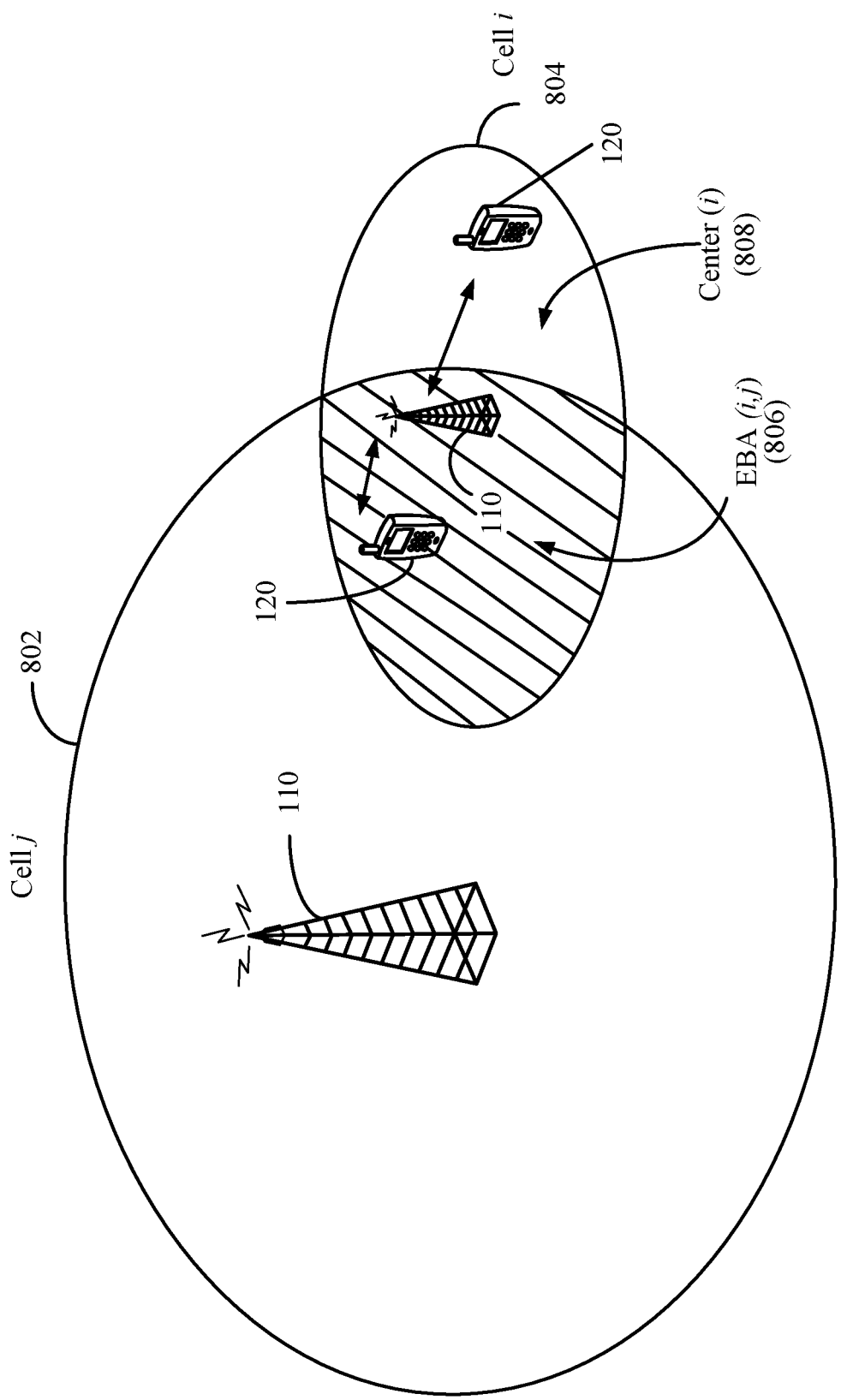
FIG. 8 illustrates an example extended boundary area (EBA) between two negotiating cells in accordance with certain aspects of the present disclosure.

FIG. 8 illustrates an example EBA between two negotiating cells, in accordance with certain aspects of the present disclosure. EBA(i,j) 806 may be defined as the EBA of cell i 804 due to interfering cell j 802. A UE 120 in EBA(i,j) 806 may be served only through the UE's interference cancellation and the eNB's interference coordination by resource partitioning between the serving eNB 110 of cell i 804 and interfering eNB 110 of cell j 802. The center(i) 808 may be considered as the rest of the coverage area of cell i 804 except for the sum of EBA(i,j) 806. The EBA of a macro cell in femto-macro scenario may be defined as the femto cell coverage under the macro cell coverage.

For certain aspects, the ARPI(i,j), where j=1 . . . n, may be considered the ARPI of cell i negotiated with cell j. For certain aspects, the ARPI (i,center) may be considered the ARPI of cell i for UEs not in the EBA. For certain aspects, N_EBA(i,j), where j=1 . . . n, is the number of served active UEs from cell i within EBA9i,j). N_EBA(i)=sum_j (N_EBA (i,j), where j=1 . . . n, may be considered as the total number of UEs of cell i on all EBAs. N(i) may be considered the total number of UEs of cell i.

There may be several input parameters for the ARPI algorithm. For example, the upper layer may provide the scheduler, such as the scheduler 344 of FIG. 3, with certain information. This information may include, for each UE, the EBA that the UE belongs to. The upper layer may track the UE's EBA by proper setting of an A3 event and the corresponding measurement report. In LTE, an event triggers a report, and an A3 event indicates when a neighbor cell becomes better than an offset relative to the serving cell. The information may also include ARPI(i,j) where j=1 . . . n, center. The U/AU subframes of ARPI(i,j), j=1 . . . n may determine the available resources for the UE in EBA(i,j), while the U/AU/AC subframes of ARPI(i,center) may determine the available resources for the UE in center(i). The upper layer may also provide the scheduler with filtering time windows for measurement and frequency of reporting. The scheduler may use the above information while scheduling resources for the UEs.

The media access control (MAC) layer may measure values for the group of UEs that belong to the same area (i.e., for all EBA(i,j), where j=1 . . . n, noEBA). The details of such parameters are defined in TS 36.314. The values may include:

DL/UL total PRB usage (% over available resources): PRB_total(i,j);
DL/UL GBR PRB usage (% over available resources): PRB_GBR(i,j);
DL/UL non-GBR PRB usage (% over available resources): PRB_non-GBR(i,j);
average number of UEs that have Dedicated Traffic Channel (DTCH) data queued on the DL/UL: N_EBA(i,j);
Average DL/UL cell data rate for GBR bearers: Bitrate_GBR(i,j); and
Average DL/UL cell data rate for non-GBR bearers: Bitrate_nonGBR(i,j).

Regarding eNB behavior for ARPI negotiation, neighbor eNBs may exchange the parameters defined above. On the input side, the eNBs may exchange serving cell (cell i) parameters from the MAC layer and neighboring cell parameters from cell j via backhaul messages. On the output side, the eNBs may exchange new ARPI(i,j) based on internal algorithms to maximize, or at least increase, system performance and fairness. If a new ARPI(i,j) is different from the current ARPI(i,j), the eNB of cell i may start negotiation with an eNB of cell j by sending a resource partitioning update request message.

Figure 9:
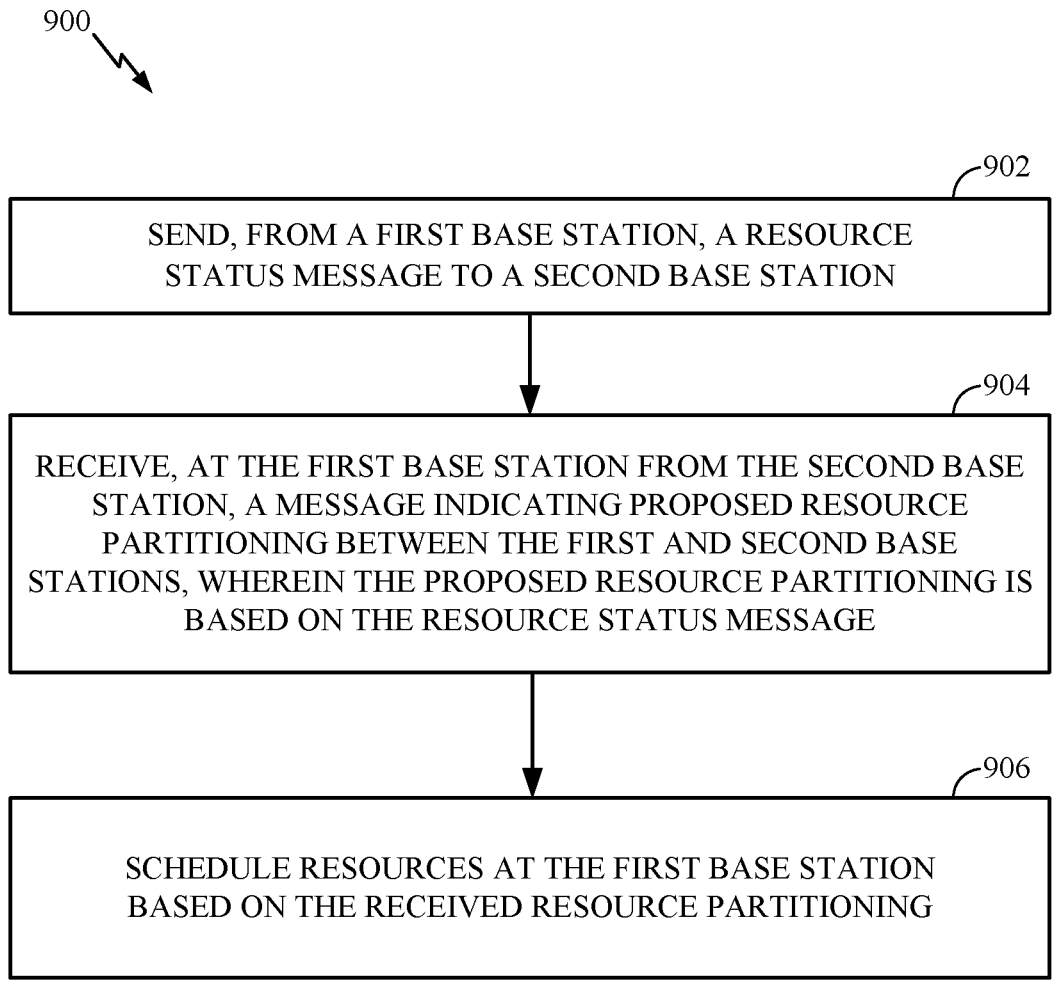
FIG. 9 is a functional block diagram conceptually illustrating example blocks executed to schedule resources at a first base station based on received proposed resource partitioning between the first and a second base station, in accordance with certain aspects of the present disclosure.

FIG. 9 is a functional block diagram conceptually illustrating example blocks 900 executed to schedule resources at a first base station based on received resource partitioning from a second base station, in accordance with certain aspects of the present disclosure. The blocks 900 may be performed, for example, by an eNB 110 as the first base station, and the second base station may also be an eNB 110, which may be of a different class and/or have a different access mode than the first base station in a HetNet. For example, the second base station may be a macro base station, whereas the first base station may be a femto or a pico base station.

At block 902, a first base station may send a resource status message to a second base station. At block 904, the first base station may receive, from the second base station, a message indicating proposed resource partitioning between the first and second base stations, wherein the proposed resource partitioning may be based on the resource status message. At block 906, the first base station may schedule resources based on the received resource partitioning.

For certain aspects, the first base station may send to the second base station a notification that the proposed resource partitioning was accepted by the first base station. For certain aspects, the first base station may receive, from the second base station before receiving the message indicating proposed resource partitioning between the first and second base stations, another message indicating another proposed resource partitioning between the first and second base stations, may reject the other proposed resource partitioning, and may send, to the second base station, a notification of the rejected proposed resource partitioning. For certain aspects, the first base station may determine one or more parameters related to resource status associated with the first base station, wherein the resource status message indicates the parameters.

Figure 10:
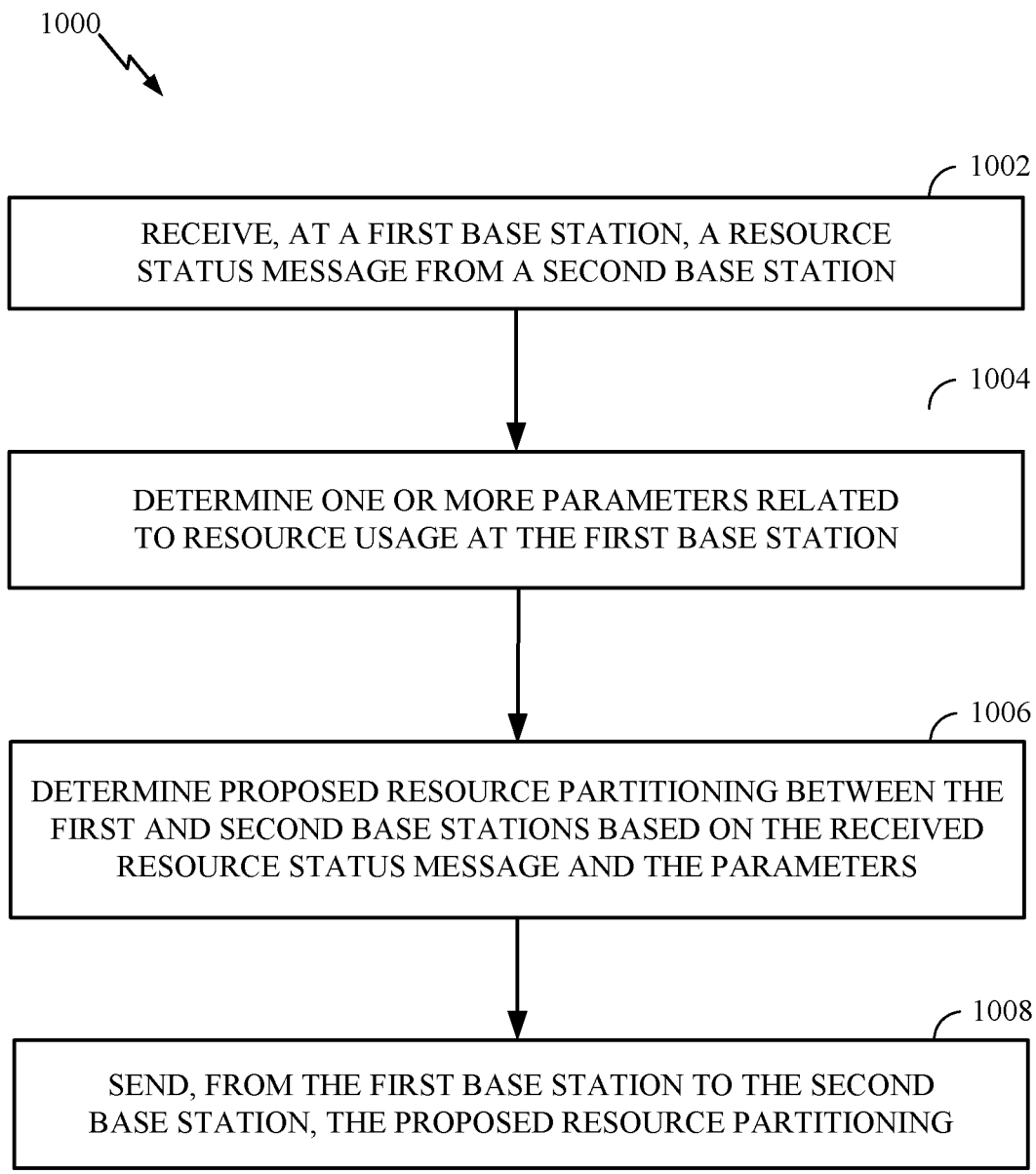
FIG. 10 is a functional block diagram conceptually illustrating example blocks executed to determine and propose resource partitioning between a first and second base station, in accordance with certain aspects of the present disclosure.

FIG. 10 is a functional block diagram conceptually illustrating example blocks 1000 executed to determine a proposed resource partitioning between a first and a second base station, in accordance with certain aspects of the present disclosure. The blocks 1000 may be performed, for example, by an eNB 110 as the first base station, and the second base station may also be an eNB 110, which may be of a different class and/or have a different access mode than the first base station in a HetNet. For example, the first base station may be a macro base station, whereas the second base station may be a pico or a femto base station.

At block 1002, a first base station may receive a resource status message from a second base station. At block 1004, the first base station may determine one or more parameters related to resource usage at the first base station. At block 1006, the first base station may determine proposed resource partitioning between the first and second base stations based on the received resource status message and the parameters. At block 1008, the first base station may send the proposed resource partitioning to the second base station.

For certain aspects, the first base station may receive a notification that the proposed resource partitioning was accepted by the second base station. For certain aspects, the first base station may receive a notification that the proposed resource partitioning was rejected by the second base station, may determine another proposed resource partitioning between the first and second base stations, and may send, to the second base station, another message indicating the other proposed resource partitioning.

For certain aspects, the first base station may determine a current resource partitioning between the first and second base stations before receiving a resource status message from a second base station, wherein the proposed resource partitioning is sent only if the proposed resource partitioning is different than the current resource partitioning. For certain aspects, the first base station may schedule resources based on an independent resource partitioning determined by the first base station for UEs in an area covered only by the first base station.

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, means for transmitting or means for sending may comprise an interface coupled between a network backhaul and the controller/processor 340 of the eNB 110 of FIG. 3 or a transmitter, a modulator 332, and/or an antenna 334 of the eNB 110 shown in FIG. 3. Means for receiving may comprise an interface coupled between a network backhaul and the controller/processor 340 of the eNB 110 of FIG. 3 or a receiver, a demodulator 332, and/or an antenna 334 of the eNB 110 shown in FIG. 3. Means for processing, means for determining, means for using, means for scheduling, and/or means for rejecting may comprise a processing system, which may include at least one processor, such as the transmit processor 320, the receive processor 338, and/or the controller/processor 340 of the eNB 110 illustrated in FIG. 3. Means for scheduling may also comprise a scheduler 344 of the eNB 110 depicted in FIG. 3.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications, comprising:
sending, from a first base station, a resource status message to a second base station;
receiving, at the first base station from the second base station, a message indicating proposed resource partitioning for inter-cell interference coordination between the first and second base stations based on the resource status message, wherein:
the proposed resource partitioning comprises an unknown indicator, a common indicator, a use indicator, and a no use indicator associated with one or more subframes,
the unknown indicator indicates that the one or more subframes are available for adaptive resource partitioning,
the common indicator indicates that the one or more subframes are available for use by the first base station and the second base station, and
the proposed resource partitioning indicates one or more resources to be used by the first base station to reduce interference with the second base station; and
scheduling resources at the first base station based on the received resource partitioning.

2. The method of claim 1, wherein the scheduling comprises scheduling the resources at the first base station based on the received resource partitioning within an extended boundary area.

3. The method of claim 2, wherein the extended boundary area comprises a cell coverage area of the first base station under a cell coverage area of the second base station.

4. The method of claim 1, wherein the scheduling comprises:
scheduling the resources based on the received resource partitioning for first user equipments (UEs) in a first area covered by the second base station and the first base station; and
scheduling the resources based on an independent resource partitioning determined by the first base station for second UEs in a second area covered only by the first base station.

5. The method of claim 1, wherein the message indicating the proposed resource partitioning is based on a load of at least one of the first base station or the second base station.

6. The method of claim 1, wherein the proposed resource partitioning comprises semi-static resource partitioning information (SRPI) or adaptive resource partitioning information (ARPI).

7. The method of claim 6, wherein the ARPI comprises additional resource partitioning information not indicated by the SRPI.

8. An apparatus for wireless communications, comprising:
a transmitter configured to transmit, from the apparatus, a resource status message to a base station;
a receiver configured to receive, at the apparatus from the base station, a message indicating proposed resource partitioning for inter-cell interference coordination between the apparatus and the base station based on the resource status message, wherein:
the proposed resource partitioning comprises an unknown indicator, a common indicator, a use indicator, and a no use indicator associated with one or more subframes,
the unknown indicator indicates that the one or more subframes are available for adaptive resource partitioning,
the common indicator indicates that the one or more subframes are available for use by the apparatus and the base station, and
the proposed resource partitioning indicates one or more resources to be used by the apparatus to reduce interference with the base station; and
at least one processor configured to schedule resources at the apparatus based on the received resource partitioning.

9. The apparatus of claim 8, wherein the at least one processor is configured to schedule the resources at the apparatus based on the received resource partitioning within an extended boundary area.

10. The apparatus of claim 9, wherein the extended boundary area comprises a cell coverage area of the apparatus under a cell coverage area of the base station.

11. The apparatus of claim 8, wherein the at least one processor is configured to:
schedule the resources based on the received resource partitioning for first user equipments (UEs) in a first area covered by the base station and the apparatus; and
schedule the resources based on an independent resource partitioning determined by the apparatus for second UEs in a second area covered only by the apparatus.

12. The apparatus of claim 8, wherein the message indicating the proposed resource partitioning is based on a load of at least one of the apparatus or the base station.

13. The apparatus of claim 8, wherein the proposed resource partitioning comprises semi-static resource partitioning information (SRPI) or adaptive resource partitioning information (ARPI).

14. The apparatus of claim 13, wherein the ARPI comprises additional resource partitioning information not indicated by the SRPI.

15. An apparatus for wireless communications, comprising:
means for sending, from the apparatus, a resource status message to a base station;
means for receiving, at the apparatus from the base station, a message indicating proposed resource partitioning for inter-cell interference coordination between the apparatus and the base station based on the resource status message, wherein:
the proposed resource partitioning comprises an unknown indicator, a common indicator, a use indicator, and a no use indicator associated with one or more subframes,
the unknown indicator indicates that the one or more subframes are available for adaptive resource partitioning, the common indicator indicates that the one or more subframes are available for use by the apparatus and the base station, and the proposed resource partitioning indicates one or more resources to be used by the apparatus to reduce interference with the base station; and means for scheduling resources at the apparatus based on the received resource partitioning.

16. The apparatus of claim 15, wherein the means for scheduling comprises means for scheduling the resources at the apparatus based on the received resource partitioning within an extended boundary area.

17. The apparatus of claim 16, wherein the extended boundary area comprises a cell coverage area of the apparatus under a cell coverage area of the base station.

18. The apparatus of claim 15, wherein the means for scheduling comprises:

means for scheduling the resources based on the received resource partitioning for first user equipments (UEs) in a first area covered by the base station and the apparatus; and means for scheduling the resources based on an independent resource partitioning determined by the apparatus for second UEs in a second area covered only by the apparatus.

19. The apparatus of claim 15, wherein the message indicating the proposed resource partitioning is based on a load of at least one of the apparatus or the base station.

20. The apparatus of claim 15, wherein the proposed resource partitioning comprises semi-static resource partitioning information (SRPI) or adaptive resource partitioning information (ARPI).

* * * * *